US012609969B2

(12) United States Patent
Gasiorek et al.

(10) Patent No.: US 12,609,969 B2
(45) Date of Patent: Apr. 21, 2026

(54) SYSTEMS AND METHODS FOR DETECTING SECURITY THREATS

(71) Applicant: Secureworks Corp., Wilmington, DE (US)

(72) Inventors: Radoslaw Gasiorek, Edinburgh (GB); John M. Nicholas, Fairfax, VA (US); Raul Garcia Calvo, Seville (ES); William Brad Arndt, Kensington, MD (US); Ryan Marcotte, Providence, RI (US)

(73) Assignee: Secureworks Corp., Dallas, TX (US)

( * ) Notice: Subject to any disclaimer, the term of this patent is extended or adjusted under 35 U.S.C. 154(b) by 672 days.

(21) Appl. No.: 17/980,000

(22) Filed: Nov. 3, 2022

(65) Prior Publication Data

US 2024/0155007 A1 May 9, 2024

(51) Int. Cl.
*H04L 9/40* (2022.01)

(52) U.S. Cl.
CPC ........ *H04L 63/205* (2013.01); *H04L 63/1425* (2013.01); *H04L 63/1441* (2013.01)

(58) Field of Classification Search
CPC  H04L 63/205; H04L 63/1425; H04L 63/1441
See application file for complete search history.

(56) References Cited

U.S. PATENT DOCUMENTS

| | | |
|---|---|---|
| 5,937,066 A | 8/1999 | Gennaro et al. |
| 6,357,010 B1 | 3/2002 | Viets et al. |

(Continued)

FOREIGN PATENT DOCUMENTS

| | | |
|---|---|---|
| EP | 3599753 A1 | 1/2020 |
| RU | 2738344 C1 | 12/2020 |

(Continued)

OTHER PUBLICATIONS

Husari et al., "Using Entropy and Mutual Information to Extract Threat Actions from Cyber Threat Intelligence," 2018 IEEE International Conference on Intelligence and Security Informatics (ISI) Year: 2018 | Conference Paper | Publisher: IEEE.*

(Continued)

*Primary Examiner* — Roderick Tolentino
(74) *Attorney, Agent, or Firm* — IP Spring

(57) ABSTRACT

A method and system for detecting malicious threat activity or event sequences is disclosed. In an embodiment, the method may include receiving security data from a plurality of data sources and normalizing the security data. The method may include generating one or more statistical profiles for one or more entities based on the normalized data. The method may include generating one or more detectors based on one or more subsequences organized in a plurality of threat chains. The method may include monitoring, via the one or more detectors, telemetric data in real time for the one or more subsequences. The method may include aggregating each detected one or more subsequences. The method may include generating a score based on a correlation of aggregated detected subsequences to the one or more statistical profiles. The method may include, if the score of exceeds a threshold, generating a high severity alert.

20 Claims, 6 Drawing Sheets

(56) References Cited

U.S. PATENT DOCUMENTS

| | | | |
|---|---|---|---|
| 7,269,578 B2 | 9/2007 | Sweeney | |
| 7,331,061 B1 | 2/2008 | Ramsey et al. | |
| 7,492,957 B1 | 2/2009 | Bonhaus et al. | |
| 7,548,932 B2 | 6/2009 | Horvitz et al. | |
| 7,555,482 B2 | 6/2009 | Korkus | |
| 7,571,474 B2 | 8/2009 | Ross et al. | |
| 7,594,270 B2 | 9/2009 | Church et al. | |
| 7,606,801 B2 | 10/2009 | Faitelson et al. | |
| 7,613,722 B2 | 11/2009 | Horvitz et al. | |
| 7,770,031 B2 | 8/2010 | MacKay et al. | |
| 7,815,106 B1 * | 10/2010 | McConnell | G06Q 30/02 |
| | | | 235/377 |
| 7,841,008 B1 | 11/2010 | Cole | |
| 7,856,411 B2 | 12/2010 | Darr | |
| 7,926,113 B1 | 4/2011 | Gula et al. | |
| 8,037,529 B1 | 10/2011 | Chiueh | |
| 8,079,081 B1 | 12/2011 | Lavrik et al. | |
| 8,082,506 B1 | 12/2011 | McConnell | |
| 8,122,495 B2 | 2/2012 | Ramsey et al. | |
| 8,156,553 B1 | 4/2012 | Church et al. | |
| 8,327,419 B1 | 12/2012 | Korablev et al. | |
| 8,407,335 B1 | 3/2013 | Church et al. | |
| 8,490,193 B2 | 7/2013 | Sarraute et al. | |
| 8,490,196 B2 | 7/2013 | Lucangeli et al. | |
| 8,522,350 B2 | 8/2013 | Davenport et al. | |
| 8,539,575 B2 | 9/2013 | Schmitlin et al. | |
| 8,578,393 B1 | 11/2013 | Fisher | |
| 8,595,170 B2 | 11/2013 | Gladstone et al. | |
| 8,621,618 B1 | 12/2013 | Ramsey et al. | |
| 8,701,176 B2 | 4/2014 | Ramsey et al. | |
| 8,793,786 B2 | 7/2014 | Bhesania et al. | |
| 8,805,881 B2 | 8/2014 | Hom et al. | |
| 8,832,048 B2 | 9/2014 | Lim | |
| 8,839,414 B2 | 9/2014 | Mantle et al. | |
| 8,898,777 B1 | 11/2014 | Oliver | |
| 8,909,673 B2 | 12/2014 | Faitelson et al. | |
| 8,928,476 B2 | 1/2015 | Jerhotova et al. | |
| 8,931,095 B2 | 1/2015 | Ramsey et al. | |
| 8,938,802 B2 | 1/2015 | Davenport et al. | |
| 8,959,115 B2 | 2/2015 | Marathe | |
| 8,984,644 B2 | 3/2015 | Oliphant et al. | |
| 9,009,828 B1 | 4/2015 | Ramsey et al. | |
| 9,032,478 B2 | 5/2015 | Ballesteros et al. | |
| 9,046,886 B2 | 6/2015 | Chong et al. | |
| 9,047,336 B2 | 6/2015 | Hom et al. | |
| 9,058,492 B1 | 6/2015 | Satish | |
| 9,069,599 B2 | 6/2015 | Martinez et al. | |
| 9,098,702 B2 | 8/2015 | Rubin et al. | |
| 9,129,105 B2 | 9/2015 | Donley et al. | |
| 9,130,988 B2 | 9/2015 | Seifert et al. | |
| 9,137,262 B2 | 9/2015 | Qureshi et al. | |
| 9,191,400 B1 | 11/2015 | Ptasinski et al. | |
| 9,195,809 B1 | 11/2015 | Kaplan | |
| 9,275,231 B1 | 3/2016 | Chen | |
| 9,298,895 B2 | 3/2016 | Lim | |
| 9,319,426 B2 | 4/2016 | Webb et al. | |
| 9,338,134 B2 | 5/2016 | Yin | |
| 9,338,180 B2 | 5/2016 | Ramsey et al. | |
| 9,430,534 B2 | 8/2016 | Bhattacharya et al. | |
| 9,438,563 B2 | 9/2016 | Yin | |
| 9,438,623 B1 | 9/2016 | Thioux | |
| 9,519,756 B2 | 12/2016 | Bitran et al. | |
| 9,544,273 B2 | 1/2017 | Fleury et al. | |
| 9,548,994 B2 | 1/2017 | Pearcy et al. | |
| 9,558,352 B1 | 1/2017 | Dennison et al. | |
| 9,560,062 B2 | 1/2017 | Khatri et al. | |
| 9,560,068 B2 | 1/2017 | Figlin et al. | |
| 9,596,252 B2 | 3/2017 | Coates et al. | |
| 9,628,511 B2 | 4/2017 | Ramsey et al. | |
| 9,667,656 B2 | 5/2017 | Banerjee et al. | |
| 9,667,661 B2 | 5/2017 | Sharma et al. | |
| 9,690,938 B1 | 6/2017 | Saxe et al. | |
| 9,692,778 B1 | 6/2017 | Mohanty | |
| 9,710,672 B2 | 7/2017 | Braun | |
| 9,712,549 B2 | 7/2017 | Almurayh | |
| 9,742,559 B2 | 8/2017 | Christodorescu et al. | |
| 9,767,302 B2 | 9/2017 | Lim | |
| 9,792,443 B1 | 10/2017 | Sheridan | |
| 9,805,202 B2 | 10/2017 | Medeiros et al. | |
| 9,825,989 B1 | 11/2017 | Mehra | |
| 9,910,986 B1 | 3/2018 | Saxe et al. | |
| 9,934,376 B1 | 4/2018 | Ismael | |
| 9,973,524 B2 | 5/2018 | Boyer et al. | |
| 9,998,480 B1 | 6/2018 | Gates | |
| 10,038,706 B2 | 7/2018 | Mekky | |
| 10,050,992 B2 | 8/2018 | Thyni et al. | |
| 10,063,582 B1 | 8/2018 | Feng et al. | |
| 10,114,954 B1 | 10/2018 | Bellis | |
| 10,116,500 B1 | 10/2018 | Long et al. | |
| 10,205,740 B2 * | 2/2019 | Stirtzinger | H04L 63/1408 |
| 10,218,733 B1 | 2/2019 | Amidon | |
| 10,270,790 B1 | 4/2019 | Jackson | |
| 10,277,625 B1 | 4/2019 | Efstathopoulos | |
| 10,311,231 B1 | 6/2019 | Kayyoor et al. | |
| 10,348,747 B2 | 7/2019 | Yamada | |
| 10,356,125 B2 | 7/2019 | Goutal et al. | |
| 10,382,473 B1 | 8/2019 | Ashkenazy | |
| 10,382,489 B2 | 8/2019 | Das et al. | |
| 10,419,903 B2 | 9/2019 | Singh et al. | |
| 10,425,223 B2 | 9/2019 | Roth et al. | |
| 10,454,950 B1 | 10/2019 | Aziz | |
| 10,474,813 B1 | 11/2019 | Ismael | |
| 10,474,820 B2 | 11/2019 | Manadhata | |
| 10,491,632 B1 | 11/2019 | Natarajan et al. | |
| 10,521,584 B1 | 12/2019 | Sharifi Mehr | |
| 10,558,809 B1 | 2/2020 | Joyce | |
| 10,567,407 B2 | 2/2020 | Tang et al. | |
| 10,594,713 B2 | 3/2020 | McLean | |
| 10,601,865 B1 | 3/2020 | Mesdaq et al. | |
| 10,630,703 B1 | 4/2020 | Ghosh et al. | |
| 10,642,753 B1 | 5/2020 | Steinberg | |
| 10,691,810 B1 | 6/2020 | Freitag | |
| 10,726,127 B1 | 7/2020 | Steinberg | |
| 10,728,263 B1 | 7/2020 | Neumann | |
| 10,735,470 B2 | 8/2020 | Vidas et al. | |
| 10,754,958 B1 | 8/2020 | Sidagni | |
| 10,762,206 B2 | 9/2020 | Titonis et al. | |
| 10,785,238 B2 | 9/2020 | McLean et al. | |
| 10,834,128 B1 | 11/2020 | Rajogopalan et al. | |
| 10,841,337 B2 | 11/2020 | Kinder | |
| 10,853,431 B1 | 12/2020 | Lin et al. | |
| 10,855,717 B1 | 12/2020 | Feiman | |
| 10,868,825 B1 | 12/2020 | Dominessy | |
| 10,915,828 B2 | 2/2021 | Qhi | |
| 10,944,758 B1 | 3/2021 | Nagargadde | |
| 10,986,144 B1 | 4/2021 | Lee | |
| 11,003,718 B2 | 5/2021 | McLean et al. | |
| 11,038,920 B1 | 6/2021 | Sellers | |
| 11,044,263 B2 | 6/2021 | McLean et al. | |
| 11,113,086 B1 | 9/2021 | Steinberg | |
| 11,140,193 B2 | 10/2021 | Patel | |
| 11,165,862 B2 | 11/2021 | Austin et al. | |
| 11,275,831 B1 | 3/2022 | Aouad et al. | |
| 11,310,268 B2 | 4/2022 | Bowditch et al. | |
| 11,381,589 B2 | 7/2022 | Tassoumt et al. | |
| 11,418,524 B2 | 8/2022 | Urbanski et al. | |
| 11,552,979 B1 | 1/2023 | Soudhamma | |
| 11,562,076 B2 | 1/2023 | El-Moussa | |
| 11,693,972 B2 | 7/2023 | Nunes | |
| 11,757,907 B1 | 9/2023 | Berger | |
| 11,863,577 B1 | 1/2024 | Miseiko | |
| 2002/0129135 A1 | 9/2002 | Delany et al. | |
| 2002/0199122 A1 | 12/2002 | Davis | |
| 2004/0128543 A1 | 7/2004 | Blake | |
| 2005/0015382 A1 | 1/2005 | Aaron | |
| 2005/0060295 A1 | 3/2005 | Gould et al. | |
| 2005/0138204 A1 | 6/2005 | Iyer et al. | |
| 2005/0138413 A1 | 6/2005 | Lippmann | |
| 2005/0166072 A1 | 7/2005 | Converse | |
| 2005/0288939 A1 | 12/2005 | Peled et al. | |
| 2006/0012815 A1 | 1/2006 | Ebner et al. | |
| 2006/0021046 A1 | 1/2006 | Cook | |
| 2006/0021048 A1 | 1/2006 | Cook | |
| 2006/0037076 A1 | 2/2006 | Roy | |

(56) References Cited

U.S. PATENT DOCUMENTS

| | | |
|---|---|---|
| 2006/0195575 A1 | 8/2006 | Delany et al. |
| 2006/0253447 A1 | 11/2006 | Judge |
| 2007/0067848 A1 | 3/2007 | Gustave |
| 2007/0143852 A1 | 6/2007 | Keanini |
| 2007/0169199 A1 | 7/2007 | Quinnell |
| 2007/0192867 A1 | 8/2007 | Miliefsky |
| 2007/0226248 A1 | 9/2007 | Darr |
| 2007/0226807 A1 | 9/2007 | Ginter et al. |
| 2007/0294756 A1 | 12/2007 | Fetik |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0262991 A1 | 10/2008 | Kapoor et al. |
| 2008/0301798 A1 | 12/2008 | Hao |
| 2008/0320000 A1 | 12/2008 | Gaddam |
| 2009/0038015 A1 | 2/2009 | Diamant |
| 2009/0113550 A1 | 4/2009 | Costa |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1 | 9/2010 | Wei et al. |
| 2011/0004771 A1 | 1/2011 | Matsushima et al. |
| 2011/0179492 A1 | 7/2011 | Markopoulou et al. |
| 2011/0197056 A1 | 8/2011 | Chen |
| 2011/0276604 A1 | 11/2011 | Hom et al. |
| 2011/0276716 A1 | 11/2011 | Coulson et al. |
| 2012/0072983 A1 | 3/2012 | McCusker et al. |
| 2012/0117640 A1 | 5/2012 | Ramsey et al. |
| 2012/0151594 A1 | 6/2012 | McClure et al. |
| 2012/0185275 A1 | 7/2012 | Loghmani |
| 2012/0222122 A1 | 8/2012 | Das |
| 2012/0233699 A1 | 9/2012 | Jajodia |
| 2012/0246730 A1 | 9/2012 | Raad |
| 2012/0254333 A1 | 10/2012 | Chandramouli et al. |
| 2012/0260341 A1 | 10/2012 | Chan et al. |
| 2013/0074188 A1 | 3/2013 | Giakouminakis et al. |
| 2013/0104191 A1 | 4/2013 | Peled et al. |
| 2013/0138428 A1 | 5/2013 | Chandramouli et al. |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0047545 A1 | 2/2014 | Sidagni |
| 2014/0051432 A1 | 2/2014 | Gupta et al. |
| 2014/0137257 A1 | 5/2014 | Martinez |
| 2014/0143863 A1 | 5/2014 | Deb et al. |
| 2014/0165195 A1 | 6/2014 | Brdiczka et al. |
| 2014/0165204 A1 | 6/2014 | Williams |
| 2014/0181981 A1 | 6/2014 | Christodorescu |
| 2014/0215629 A1 | 7/2014 | Raz et al. |
| 2014/0222712 A1 | 8/2014 | Samaha et al. |
| 2014/0223555 A1 | 8/2014 | Sanz Hernando et al. |
| 2014/0283081 A1 | 9/2014 | Sheridan |
| 2014/0283083 A1 | 9/2014 | Gula |
| 2014/0331207 A1 | 11/2014 | Sridharan |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0074390 A1 | 3/2015 | Stoback et al. |
| 2015/0135287 A1 | 5/2015 | Medeiros et al. |
| 2015/0135320 A1 | 5/2015 | Coskun |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0310211 A1 | 10/2015 | Mei et al. |
| 2015/0324457 A1 | 11/2015 | McLean |
| 2015/0332054 A1 | 11/2015 | Eck |
| 2015/0365437 A1 | 12/2015 | Bell, Jr. |
| 2016/0006749 A1 | 1/2016 | Cohen et al. |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0112445 A1 | 4/2016 | Abramowitz |
| 2016/0134653 A1 | 5/2016 | Vallone |
| 2016/0139886 A1 | 5/2016 | Perdriau et al. |
| 2016/0156655 A1 | 6/2016 | Lotem et al. |
| 2016/0162690 A1 | 6/2016 | Reith |
| 2016/0182546 A1 | 6/2016 | Coates et al. |
| 2016/0205127 A1 | 7/2016 | Roehl |
| 2016/0241580 A1* | 8/2016 | Watters .................. H04L 63/20 |
| 2016/0241591 A1 | 8/2016 | Ramsey et al. |
| 2016/0248789 A1 | 8/2016 | Nakamatsu |
| 2016/0253497 A1 | 9/2016 | Christodorescu |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla et al. |
| 2017/0026343 A1 | 1/2017 | Wardman |
| 2017/0026391 A1 | 1/2017 | Abu-Nimeh |
| 2017/0063893 A1 | 3/2017 | Franc et al. |
| 2017/0063905 A1 | 3/2017 | Muddu et al. |
| 2017/0093902 A1 | 3/2017 | Roundy et al. |
| 2017/0098087 A1 | 4/2017 | Li |
| 2017/0111379 A1 | 4/2017 | Khatri et al. |
| 2017/0111384 A1 | 4/2017 | Loureiro |
| 2017/0126710 A1 | 5/2017 | De-Levie |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen et al. |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0243004 A1 | 8/2017 | Kinder et al. |
| 2017/0243005 A1 | 8/2017 | Kinder et al. |
| 2017/0243009 A1 | 8/2017 | Sejpal |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1 | 11/2017 | Holland et al. |
| 2017/0318034 A1 | 11/2017 | Holland et al. |
| 2017/0346839 A1 | 11/2017 | Peppe |
| 2017/0359368 A1 | 12/2017 | Hodgman et al. |
| 2018/0004948 A1 | 1/2018 | Martin |
| 2018/0069885 A1 | 3/2018 | Patterson |
| 2018/0077189 A1 | 3/2018 | Doppke et al. |
| 2018/0077195 A1 | 3/2018 | Gathala |
| 2018/0089574 A1 | 3/2018 | Goto |
| 2018/0091306 A1 | 3/2018 | Antonopoulos et al. |
| 2018/0096140 A1 | 4/2018 | Bulygin |
| 2018/0103010 A1 | 4/2018 | Diaz Cuellar et al. |
| 2018/0124073 A1 | 5/2018 | Scherman et al. |
| 2018/0124085 A1 | 5/2018 | Frayman et al. |
| 2018/0124092 A1 | 5/2018 | Pope |
| 2018/0124094 A1 | 5/2018 | Hamdi |
| 2018/0129811 A1 | 5/2018 | Diu |
| 2018/0152480 A1 | 5/2018 | Kinder et al. |
| 2018/0181599 A1 | 6/2018 | Crabtree et al. |
| 2018/0219899 A1 | 8/2018 | Joy |
| 2018/0234434 A1 | 8/2018 | Viljoen |
| 2018/0270126 A1 | 9/2018 | Tapia |
| 2018/0288198 A1 | 10/2018 | Pope et al. |
| 2018/0324203 A1 | 11/2018 | Estes |
| 2018/0367550 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0052663 A1 | 2/2019 | Lee et al. |
| 2019/0068630 A1 | 2/2019 | Valecha et al. |
| 2019/0095320 A1 | 3/2019 | Biswas et al. |
| 2019/0095801 A1 | 3/2019 | Saillet et al. |
| 2019/0102554 A1 | 4/2019 | Luo et al. |

(56) References Cited

U.S. PATENT DOCUMENTS

| | | |
|---|---|---|
| 2019/0102564 A1 | 4/2019 | Li |
| 2019/0102646 A1 | 4/2019 | Redmon et al. |
| 2019/0104154 A1 | 4/2019 | Kumar et al. |
| 2019/0109717 A1 | 4/2019 | Reddy |
| 2019/0122258 A1 | 4/2019 | Bramberger et al. |
| 2019/0132344 A1 | 5/2019 | Lem et al. |
| 2019/0166149 A1 | 5/2019 | Gerrick |
| 2019/0166152 A1 | 5/2019 | Steele |
| 2019/0173919 A1 | 6/2019 | Irimie et al. |
| 2019/0242718 A1 | 8/2019 | Siskind et al. |
| 2019/0258807 A1 | 8/2019 | DiMaggio et al. |
| 2019/0297096 A1 | 9/2019 | Ahmed et al. |
| 2019/0342296 A1 | 11/2019 | Anandam et al. |
| 2019/0347423 A1 | 11/2019 | Sanossian |
| 2019/0347433 A1 | 11/2019 | Chakravorty et al. |
| 2019/0370472 A1 | 12/2019 | Hodgman |
| 2020/0012796 A1 | 1/2020 | Trepagnieer |
| 2020/0036750 A1 | 1/2020 | Bahnsen et al. |
| 2020/0036751 A1 | 1/2020 | Kohavi |
| 2020/0057857 A1 | 2/2020 | Roytman |
| 2020/0067980 A1 | 2/2020 | Livny |
| 2020/0074084 A1 | 3/2020 | Dorrans |
| 2020/0082080 A1 | 3/2020 | Boulton |
| 2020/0097662 A1 | 3/2020 | Hufsmith |
| 2020/0097663 A1 | 3/2020 | Sato |
| 2020/0110873 A1 | 4/2020 | Rosendahl |
| 2020/0120126 A1 | 4/2020 | Ocepek |
| 2020/0134175 A1* | 4/2020 | Marwah .................. G06F 9/542 |
| 2020/0159525 A1 | 5/2020 | Bhalla |
| 2020/0177618 A1 | 6/2020 | Hassanzadeh |
| 2020/0186544 A1 | 6/2020 | Dichiu et al. |
| 2020/0186569 A1 | 6/2020 | Milazzo |
| 2020/0195683 A1 | 6/2020 | Kuppa et al. |
| 2020/0210590 A1 | 7/2020 | Doyle |
| 2020/0213346 A1 | 7/2020 | Shafet |
| 2020/0257792 A1 | 8/2020 | Rivard |
| 2020/0259791 A1 | 8/2020 | Garcia et al. |
| 2020/0274894 A1 | 8/2020 | Argoeti et al. |
| 2020/0285737 A1 | 9/2020 | Kraus |
| 2020/0285952 A1 | 9/2020 | Liu et al. |
| 2020/0314122 A1 | 10/2020 | Jones et al. |
| 2020/0327237 A1 | 10/2020 | Shakarian |
| 2020/0329062 A1 | 10/2020 | Beauchesne |
| 2020/0336497 A1 | 10/2020 | Seul et al. |
| 2020/0351285 A1 | 11/2020 | Eisenkot et al. |
| 2020/0351302 A1 | 11/2020 | Kyle et al. |
| 2020/0351307 A1 | 11/2020 | Vidas et al. |
| 2020/0356665 A1 | 11/2020 | Denney et al. |
| 2020/0358780 A1* | 11/2020 | Anbalagan ............ H04L 63/102 |
| 2020/0364338 A1 | 11/2020 | Ducau et al. |
| 2020/0372129 A1 | 11/2020 | Gupta |
| 2020/0372154 A1 | 11/2020 | Bacher et al. |
| 2020/0380119 A1 | 12/2020 | Correa Bahnsen et al. |
| 2020/0389472 A1 | 12/2020 | Drapeau |
| 2020/0394309 A1 | 12/2020 | Angelo et al. |
| 2021/0006575 A1 | 1/2021 | McLean et al. |
| 2021/0006586 A1* | 1/2021 | Deshpande ............ G06F 21/31 |
| 2021/0012012 A1 | 1/2021 | Soroush |
| 2021/0034752 A1 | 2/2021 | Canada |
| 2021/0034753 A1 | 2/2021 | Canada |
| 2021/0034895 A1 | 2/2021 | Archibald |
| 2021/0037055 A1 | 2/2021 | Dumont et al. |
| 2021/0067562 A1 | 3/2021 | Kinder et al. |
| 2021/0073819 A1* | 3/2021 | Hernandez ......... G06Q 20/4016 |
| 2021/0103663 A1 | 4/2021 | Gadhe |
| 2021/0109797 A1 | 4/2021 | Zhou |
| 2021/0112078 A1 | 4/2021 | Huston, III |
| 2021/0112090 A1 | 4/2021 | Rivera et al. |
| 2021/0133320 A1 | 5/2021 | Havenga |
| 2021/0157926 A1 | 5/2021 | Handurukande |
| 2021/0157945 A1 | 5/2021 | Cobb |
| 2021/0160273 A1 | 5/2021 | Choi |
| 2021/0173930 A1 | 6/2021 | Dahal |
| 2021/0173935 A1 | 6/2021 | Ramasamy |
| 2021/0185057 A1 | 6/2021 | McLean |
| 2021/0192057 A1 | 6/2021 | Helfman |
| 2021/0194853 A1 | 6/2021 | Xiao |
| 2021/0200840 A1 | 7/2021 | Kannan |
| 2021/0211450 A1 | 7/2021 | Aleidan |
| 2021/0216928 A1 | 7/2021 | O'Toole |
| 2021/0226926 A1 | 7/2021 | Crabtree |
| 2021/0226970 A1 | 7/2021 | Ross et al. |
| 2021/0226982 A1 | 7/2021 | Marty |
| 2021/0226983 A1 | 7/2021 | Cunningham |
| 2021/0256113 A1 | 8/2021 | Stott et al. |
| 2021/0258327 A1 | 8/2021 | Felke et al. |
| 2021/0273957 A1 | 9/2021 | Boyer |
| 2021/0273958 A1* | 9/2021 | McLean ............. H04L 63/1433 |
| 2021/0281609 A1 | 9/2021 | Crabtree |
| 2021/0306372 A1 | 9/2021 | Koral |
| 2021/0312058 A1 | 10/2021 | Chiarelli |
| 2021/0312351 A1 | 10/2021 | Pourmohammad |
| 2021/0342441 A1 | 11/2021 | Ross |
| 2021/0360007 A1 | 11/2021 | Paquin |
| 2021/0367961 A1 | 11/2021 | Kuppa |
| 2021/0390181 A1 | 12/2021 | McClay |
| 2022/0004643 A1 | 1/2022 | Sloane |
| 2022/0006818 A1 | 1/2022 | Cunningham |
| 2022/0014542 A1 | 1/2022 | Janakiraman |
| 2022/0021691 A1 | 1/2022 | Bhatkar |
| 2022/0038424 A1 | 2/2022 | Liu et al. |
| 2022/0043911 A1 | 2/2022 | Pomerantsev |
| 2022/0070182 A1 | 3/2022 | Bowditch et al. |
| 2022/0070193 A1 | 3/2022 | Konda et al. |
| 2022/0070279 A1 | 3/2022 | Pang |
| 2022/0078203 A1 | 3/2022 | Shakarian |
| 2022/0083644 A1 | 3/2022 | Kulshreshtha |
| 2022/0100868 A1 | 3/2022 | Tarrant |
| 2022/0101326 A1 | 3/2022 | Kim et al. |
| 2022/0159033 A1 | 5/2022 | Mizrahi |
| 2022/0159034 A1* | 5/2022 | Volkov .................. G06F 21/552 |
| 2022/0174077 A1 | 6/2022 | Sel |
| 2022/0179908 A1 | 6/2022 | Wei |
| 2022/0191230 A1 | 6/2022 | Morgan |
| 2022/0206819 A1 | 6/2022 | Pokam |
| 2022/0210168 A1 | 6/2022 | Yavo |
| 2022/0210656 A1 | 6/2022 | Shaw |
| 2022/0237764 A1 | 7/2022 | Mullet |
| 2022/0263850 A1 | 8/2022 | Colyandro, Jr. |
| 2022/0263858 A1 | 8/2022 | Bargnesi et al. |
| 2022/0394034 A1 | 12/2022 | Keith |
| 2022/0400135 A1 | 12/2022 | Gamra |
| 2022/0407891 A1 | 12/2022 | Albanese |
| 2022/0414206 A1 | 12/2022 | Hinkle |
| 2023/0009127 A1* | 1/2023 | Boyer ................. H04L 63/1441 |
| 2023/0021226 A1 | 1/2023 | Bobrov |
| 2023/0021414 A1 | 1/2023 | Kumar |
| 2023/0038196 A1 | 2/2023 | Labreche |
| 2023/0095756 A1* | 3/2023 | Wilkinson .......... H04L 63/1416 726/6 |
| 2023/0105087 A1 | 4/2023 | Borges |
| 2023/0370486 A1 | 11/2023 | Paquette et al. |
| 2023/0421578 A1 | 12/2023 | Mullins et al. |
| 2024/0031411 A1 | 1/2024 | Levari et al. |
| 2024/0106838 A1 | 3/2024 | Gasiorek et al. |

FOREIGN PATENT DOCUMENTS

| | | |
|---|---|---|
| WO | WO2007/002749 A2 | 1/2007 |
| WO | WO2007/090605 A1 | 8/2007 |
| WO | WO2010/059843 A2 | 5/2010 |
| WO | WO2021/067238 A1 | 4/2021 |

OTHER PUBLICATIONS

Le et al., "Security threat probability computation using Markov Chain and Common Vulnerability Scoring System," 2018 28th International Telecommunication Networks and Applications Conference (ITNAC) Year: 2018 | Conference Paper | Publisher: IEEE.*
Notification, International Search Report and the Written Opinion of the International Search Authority regarding related Application No. PCT/US23/34511 dated Jan. 22, 2024.

(56)　　References Cited

OTHER PUBLICATIONS

Buyukkayhan, Ahmet Sali; Oprea, Alina; Li, Zhou; and Robertson, William; *"Lens on the endpoint; Hunting for malicious software through endpoint data analysis"*; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

Secureworks—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y.; Reengineering Legacy Systems with RESTFul Web Service; 2008 32nd Annual IEEE International Computer Software and Applications Conference, 2008; pp. 785-790; doi: 10.1109/COMPSAC.2008.89; 2008.

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.

URLVoid; URLVoid.com; retrieved from archives.org: https: web. archive.org/web/20180730215132/https.://www.urlvoid.com/); Published Jul. 30, 2018.

"International Preliminary Report on Patentability in International Application No. PCT/US2023/034511", May 15, 2025, 7 pages.

* cited by examiner

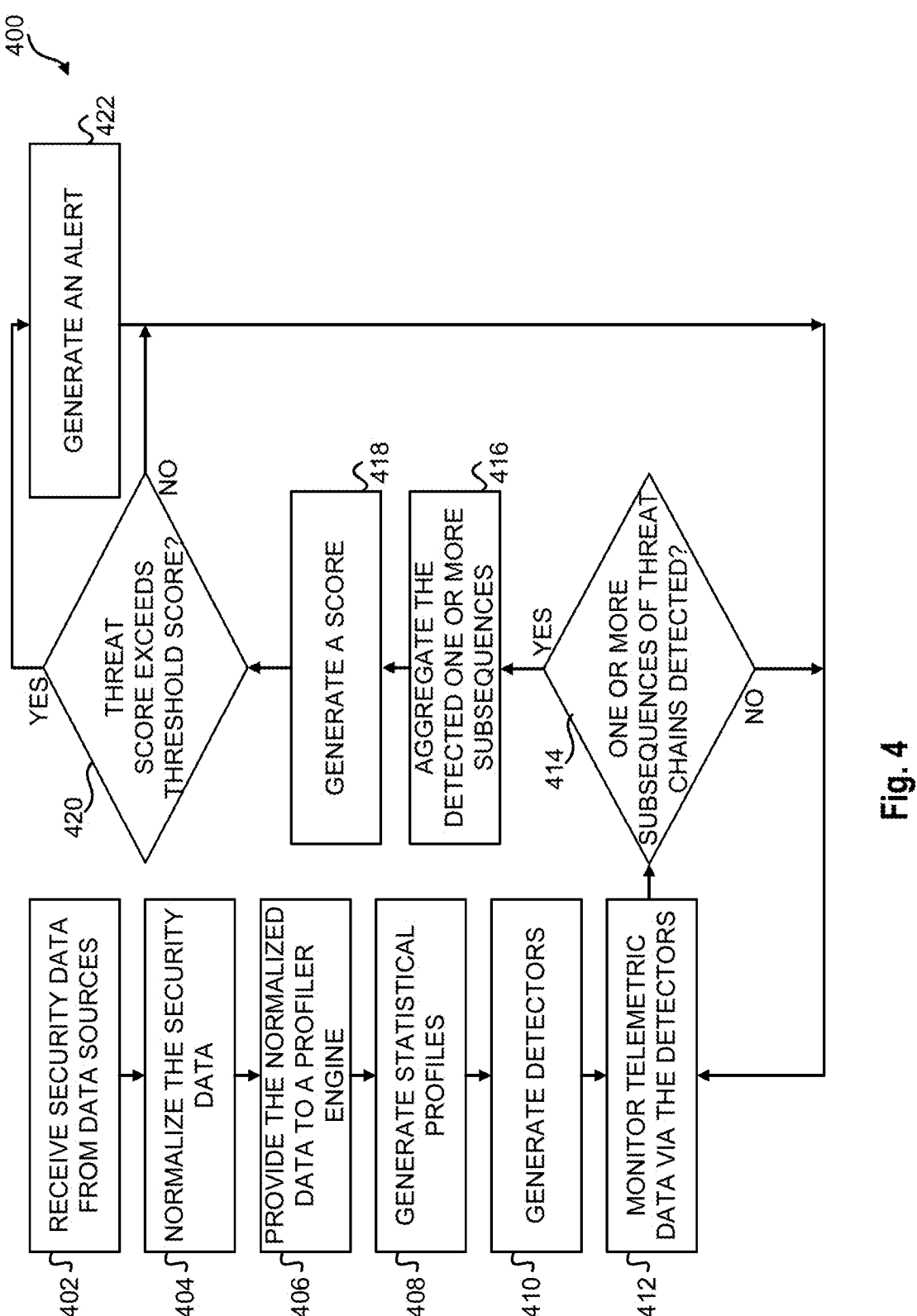

400

422

GENERATE AN ALERT

YES

420

THREAT SCORE EXCEEDS THRESHOLD SCORE?

NO

418

GENERATE A SCORE

416

AGGREGATE THE DETECTED ONE OR MORE SUBSEQUENCES

YES

414

ONE OR MORE SUBSEQUENCES OF THREAT CHAINS DETECTED?

NO

402   RECEIVE SECURITY DATA FROM DATA SOURCES

404   NORMALIZE THE SECURITY DATA

406   PROVIDE THE NORMALIZED DATA TO A PROFILER ENGINE

408   GENERATE STATISTICAL PROFILES

410   GENERATE DETECTORS

412   MONITOR TELEMETRIC DATA VIA THE DETECTORS

Fig. 4

SYSTEMS AND METHODS FOR DETECTING SECURITY THREATS

TECHNICAL FIELD

This disclosure generally relates to systems and methods for detecting security threats; and more particularly, relates to systems and methods to analyze data at rest and/or historical data, and real-time data, and, via a correlation between analyzed data at rest and/or historical data and analyzed real-time data, determine whether to indicate a high severity alert.

BACKGROUND

Statistical and un-supervised learning security detection engines or devices may generate noisy and/or many, non-actionable security alerts. Such security alerts may not be sent to security analysts for investigation. Thus, some events that are actual threats, that may include or comprise non-actionable security alerts, may not be recognized or flagged. Further, if all these alerts are sent to a security analyst for review, review of such alerts may consume large amounts of time.

On the other hand, supervised learning utilizes training data labelled by experts and/or oracles prior to building models or classifiers, but may be costly, since the operation may utilize many resources (e.g., security analysts or experts with a high level of expertise) to label large data volumes.

Accordingly, it can be seen that a need exists for systems and methods for detection of threats or malicious activity that can monitor and process incoming security data and separate potential threats or malicious activity from non-actionable activities to determine whether an alert should be issues and/or a security analyst notified. The present disclosure is directed to the foregoing and other related, and unrelated, problems/issues in the art.

SUMMARY

Briefly described, according to various aspects, the present disclosure is directed to systems and methods for detecting security threats and/or malicious activities; and in embodiments, to systems and methods for detecting such security threats and/or malicious activities that may be part of and/or hidden among non-actionable activities, based on a review and determination of a correlation between occurrences or sequences of such non-actionable activities included within incoming security data in view of prior data, e.g. data at rest and/or historical data.

In embodiments, such systems and methods may comprise or utilize a memory (or a plurality of memories) and/or at least one processor. Such a system further may include a profiler engine, a normalizer engine, and/or a detector engine, each of which engines can include a separate memory associated therewith or accessible by such engine. The normalizer engine may be configured to normalize the data at rest and/or telemetric data, prior to or after reception by the profiler engine and/or detector engine (e.g., and, in an example, by the one or more detectors). In embodiments, the data at rest and/or telemetric data may include data in a format specific to an entity and/or organization or enterprise (e.g., the organization or enterprise including a plurality of entities). Thus, the normalizer engine may reformat or format the data at rest and/or telemetric data, such that the data at rest and/or telemetric data may be processed by the profiler engine and/or detector engine.

The profiler engine may be configured to request, obtain, and/or receive data, e.g., in embodiments, security logs or other security data. The data can include data at rest, which can comprise historical data or older data (e.g., older than data received in real-time). In some embodiments, the data at rest may be stored in a repository, data lake, database, and/or another type of storage and/or memory. The data at rest may correspond to one or more different entities. The data at rest also may include statistical information or data relating to each of the one or more different entities. In various embodiments, the entities may comprise users, computing devices, IP addresses, etc. The profiler engine may be configured to utilize the data at rest to generate one or more statistical profiles for each of the one or more entities. In an embodiment, each profile may include, rather than or in addition to statistical data, trend data and/or other entity data.

The detector engine may utilize one or more subsequences organized in a plurality of threat chains and/or the threat chains to generate a plurality or one or more detectors. In embodiments, the detectors may be configured to detect a specified condition, statistic, behavior, or other data (e.g., based on the subsequences specified and/or organized in each of the plurality of threat chains). Once one of or more than one subsequence are detected, the detector engine may aggregate each of the detected subsequences and correlate the subsequences to one of the statistical profiles. The correlation may be utilized by the detector engine to generate a score. In another embodiment, correlating one of the statistical profiles with aggregated detected subsequences may generate a score. If the score exceeds a threshold, then the detector engine may generate and transmit an alert or high severity alert.

Thus, the systems and methods disclosed herein are adapted to enable and/or provide for review, detection and generation of a single alert for a high severity threat comprised of low fidelity sequences or subsequences, which, by themselves, may be considered to constitute low or non-actionable activities or events. Thus, users are notified of actual threats, rather than for many low fidelity sequences or subsequences that may or may not be a threat. Further, such systems and methods may enable security experts or analysts to analyze potential high severity threats occurring at lower frequency than many low fidelity sequences or subsequences, thus increasing efficiency and lowering cost and time.

In one aspect, the present disclosure provides a system for detecting security threats. The system may include a series of engines, each having a memory and at least one processor. The system may include a profiler engine. The profiler engine may be configured to obtain data at rest from a repository and corresponding to a plurality of entities. The profiler engine may be configured to mine, selected statistical information from the obtained data at rest and generate a plurality of statistical profiles based on the data at rest, the profiles comprising the selected statistical information relating to and for each entity of the plurality of entities. The profiler engine may be configured to store the plurality of statistical profiles in a profile database. The system may include a detector engine. The detector engine may be configured to generate one or more low fidelity detectors based on the statistical profiles of each entity of the plurality of entities organized in one or more threat chains, the one or more detectors configured to detect different low security threats in one or more threat chains. The detector engine may be configured to monitor, via each of the one or more detectors, real-time data corresponding to the plurality of entities for the plurality of low fidelity security threats. The detector engine may be configured to generate a score based on a correlation of a detected aggregation of the plurality of low fidelity security threats to the plurality of statistical profiles. The detector engine may be configured to, if the score exceeds a threshold, generate an alert.

In one aspect, the data at rest may comprise historical data, and wherein the repository comprises a data lake. In embodiments, the plurality of entities may comprise one or more of a user or a computing device. Each of the one or more threat chains may comprise a sequence of events defining security threat, and wherein the score is based on an occurring amount of low level security threats in one of the one or more threat chain. The score may further be based on an order in which low level security threat occur. Each of the plurality of profiles may include statistical analysis for a corresponding entity. Some of the plurality of profiles may include statistics corresponding to a service accessed by the corresponding entity. The system may include a normalization engine. The normalization engine may be configured to receive data from a plurality of different data sources. The normalization engine may be configured to normalize the data received prior to generation of the plurality of profiles and storage thereof in the profile database.

In another aspect, the present disclosure provides a method for detecting security threats. In embodiments, the method may include receiving security data associated with one or more entities from a plurality of data sources. The method may include normalizing the security data to thereby form normalized data. The method may include providing the normalized data to a profiler engine. The method may include generating, via the profiler engine, one or more statistical profiles for the one or more entities based on the normalized data. The method may include generating one or more detectors based on one or more subsequences organized in a plurality of threat chains. The method may include monitoring, via the one or more detectors, telemetric data in real time for the one or more subsequences for each of the plurality of threat chains. The method further may include, in response to detection of one or more subsequences of one of the plurality of threat chains by the one or more detectors, aggregating each detected one or more subsequences. The method also may include generating a score based on a correlation of aggregated detected one or more subsequences to the one or more entity profiles. The method may include, if the score of exceeds a threshold score, generating a high severity alert.

In an embodiment, the method may include, prior to generating one or more entity profiles, obtaining the data at rest from a data lake, wherein the data at rest includes historical data. The one more subsequences may comprise one or more of events, files associated with the events, time stamps, or identification or identifying data. The identification or identifying data may comprise one or more of usernames or IP addresses. In some embodiments, the method may include storing the one or more entity profiles in a profile database. The one or more entities further can comprise one or more of a user, a server, an IP address, or other computing device. The user may comprise a cloud-based platform user.

In another aspect, the disclosure provides for a non-transitory machine-readable storage medium storing processor-executable instructions that are executed by at least one processor. In some embodiments, execution of the instructions may cause the at least one processor to, in response to reception of security data associated with the one or more entities from a plurality of data sources, normalize the security data. The processor may generate one or more statistical profiles for one or more entities based on the security data. The processor may generate one or more detectors based on one or more subsequences organized in a plurality of threat chains. The processor may monitor, via the one or more detectors, telemetric data from the cloud-based platform in real time for the one or more subsequences for each of the plurality of threat chains. The processor may, in response to detection of one or more subsequences of one of the plurality of threat chains by the one or more detectors, aggregate each detected one or more subsequences. The processor may generate a score based on a correlation of aggregated detected one or more subsequences to the one or more entity profiles. The processor may, if the score of exceeds a threshold score, generate a high severity alert.

In an embodiment, the one or more entity profiles may include statistical data. The one or more entities may comprise one or more users. The statistical data may comprise a number of times each of the one or more users accessed a cloud-based service on a cloud-based platform.

In another aspect, the disclosure provides for a system for detecting security threats, and a method for detecting security threats. For example, in embodiments, a method is provided that may include storing historical telemetric data at rest in a data lake. The method may include building statistical profiles based on the historical telemetric data at rest in the data lake. The method may include receiving a definition for one or more low fidelity detectors. The method may include generating the one or more low fidelity detectors based on the one or more definitions. The method may include listening to real-time telemetric data via the one or more low fidelity detectors. The method may include, in response to detection of low fidelity threats by the one or more low fidelity detectors, correlating the low fidelity threats with the statistical profiles to generate a score. The method may include, in response to the score exceeding a threshold, generating a high severity alert. In an embodiment, a security computing device may provide the definition for the one or more detectors, and the high severity alert may be transmitted to the security computing device and/or another security computing device.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a flow diagram for detecting security threats, according to principles of the present disclosure.

The use of the same reference symbols in different drawings indicates similar or identical items.

DETAILED DESCRIPTION

Figure 1:
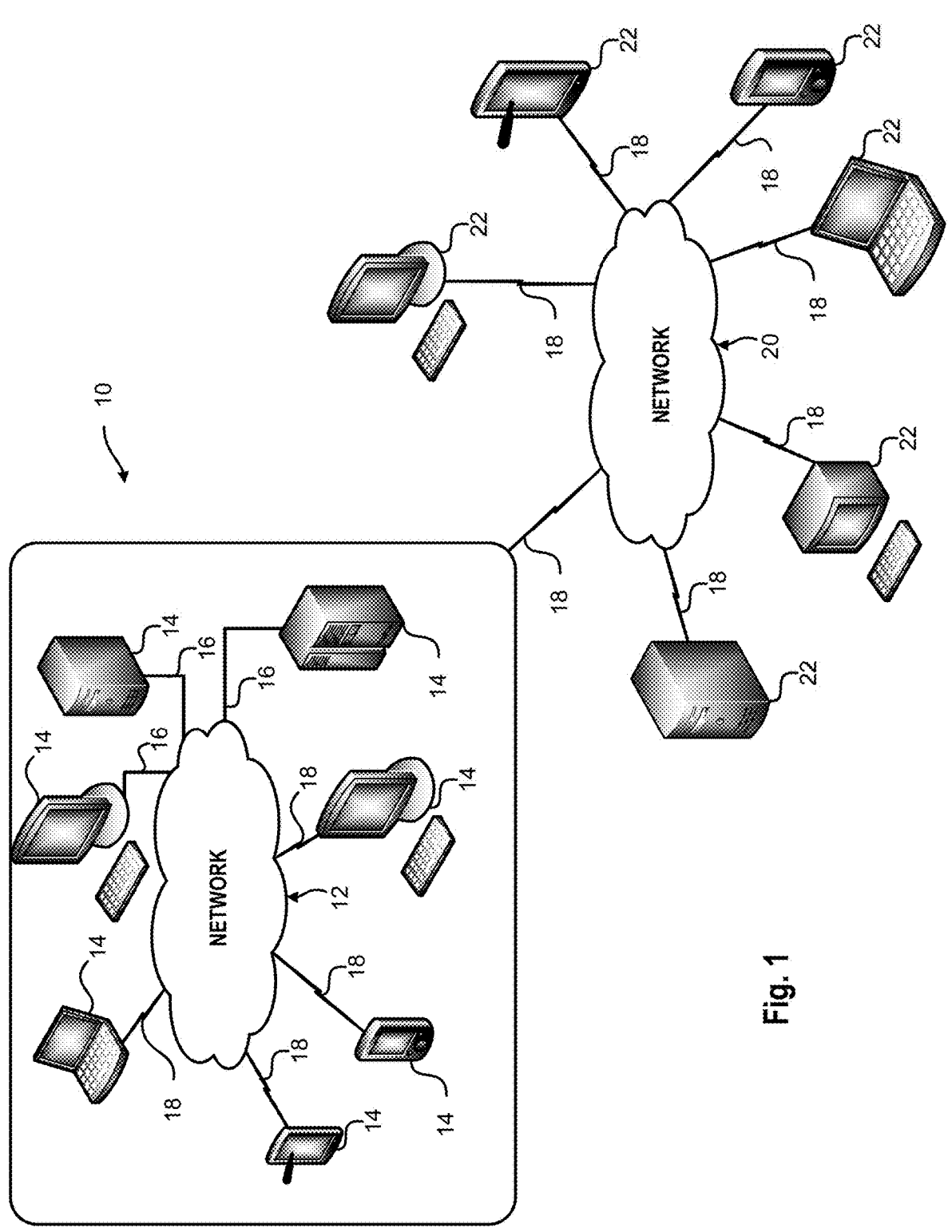
FIG. 1 is a block diagram of an example data center including a networked system of information handling systems, according to principles of the present disclosure.

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Briefly described, according to various aspects, the present disclosure is directed to systems and methods for detecting security threat. Such systems and methods may comprise or utilize a memory and/or at least one processor. Such a system may include a profiler engine, a normalizer engine, and/or a detector engine. The profiler engine may be configured to request, obtain, and/or receive data. The data may be data at rest. Data at rest may be historical data or older data (e.g., older than data received in real-time). The data at rest may be stored in a repository, data lake, database, and/or another type of storage and/or memory. The data at rest may correspond to one or more different entities. The data at rest may include statistical information or data relating to each of the one or more different entities. The entities may be users, computing devices, IP addresses, etc. The profiler engine may be configured to utilize the data at rest to generate one or more statistical profiles for each of the one or more entities. In an embodiment, each profile may include, rather than or in addition to statistical data, trend data and/or other entity data.

The normalizer engine may be configured to normalize the data at rest and/or telemetric data, prior to or after reception by the profiler engine and/or detector engine (e.g., and, in an example, one or more detectors). The data at rest and/or telemetric data may include data in a format specific to an entity and/or organization or enterprise (e.g., the organization or enterprise including a plurality of entities). Thus, the normalizer engine may reformat or format the data at rest and/or telemetric data, such that the data at rest and/or telemetric data may be processed by the profiler engine and/or detector engine.

The detector engine may utilize one or more subsequences organized in a plurality of threat chains and/or the threat chains to generate a plurality or one or more detectors. The detectors may be configured to detect a specified condition, statistic, behavior, or other data (e.g., based on the subsequences specified and/or organized in each of the plurality of threat chains). Once one of or more than one subsequence are detected, the detector engine may aggregate each of the detected subsequences and correlate the subsequences to one of the statistical profiles. The correlation may be utilized by the detector engine to generate a score. In another embodiment, correlating one of the statistical profiles with aggregated detected subsequences may generate a score. If the score exceeds a threshold, then the detector engine may generate and transmit an alert or high severity alert.

Thus, the system and methods disclosed herein are adapted to enable and/or provide for a single alert for a high severity threat comprised of low fidelity sequences or subsequences, which, by themselves, may be considered to constitute low or non-actionable activities or events. Thus, users are notified of actual threats, rather than for many low fidelity sequences or subsequences that may or may not be a threat. Further, such systems and methods may enable security experts or analysts to analyze potential high severity threats occurring at lower frequency than many low fidelity sequences or subsequences, thus increasing efficiency and lowering cost and time.

As shown in FIGS. 1-5, the present disclosure includes systems and methods for detecting security threats. The systems and methods disclosed herein are adapted to enable creation or generation of curated sets of malicious sequence detection rules and/or for automatic monitoring of malicious events or threat activities based on the curated sets of malicious sequence detection rules.

FIG. 1 schematically illustrates an exemplary data center 10 that can be in communication with or incorporated as part of the system and methods for detecting security threats. As shown in FIG. 1, the data center 10 can include a network 12 that may provide communications among a plurality of information handling systems 14, which can include workstations, personal computers, smart cellular telephones, personal digital assistants, laptop computers, servers, computing devices, other suitable devices, and/or combinations thereof. The information handling systems 14 further can be coupled to the network 12 through wired line connections 16, wireless connections 18, or any other suitable lines of communication or connection.

As further shown in FIG. 1, in embodiments, the data center 10, and/or one or more of the information handling systems 14 thereof, can be communicatively coupled to a network, including a cloud based or other network as shown at 12 or 20 in FIG. 1, for example, through wired line connection 16, or through any other suitable connection, such as a wireless connection 18 (e.g., Wi-Fi, cellular, etc.). The network 12 further can be accessible to/by one or more user or client managed information handling systems or devices 22 to facilitate communication between the client managed information handling systems 22 and the data center 10 for which rules may be generated and/or enforced. The network 12 can include an API interface of the event management center, though the network can include any suitable network, such as the Internet or other wide area network, a local area network, or a combination of networks, and may provide communications, e.g., data communications, among the event management center and the client managed information handling systems 22.

The client managed information handling systems 22 can be connected to the network 20 through wired connections, e.g., an Ethernet cable, or other suitable wired or wireless connections 18, e.g., Wi-Fi, Bluetooth®, cellular connections (e.g., 3G, 4G, LTE, 5G, etc.), other suitable wireless connections or combinations thereof (FIG. 1), to enable the clients or operators of information handling systems 22 to communicate with the event management center, e.g., to access one or more services provided thereby. For example, the event management center can be or include a web service.

For purposes of the present disclosure, the information handling systems 14/22 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, and/or a video display. The information handling systems also may include one or more buses operable to transmit communications between the various hardware components.

Figure 2A:
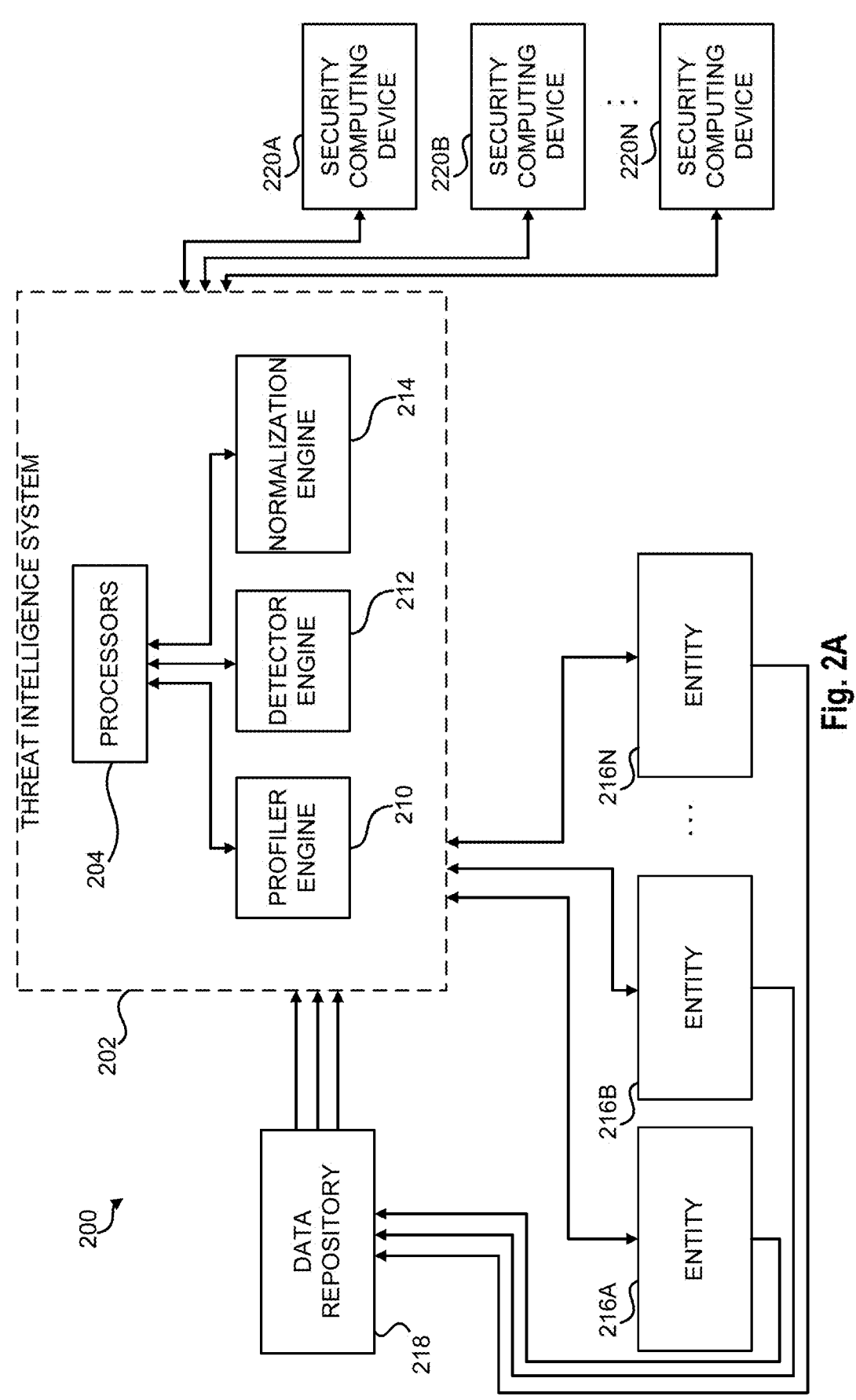
FIG. 2A and FIG. 2B are schematic diagrams of systems for detecting security threats, according to principles of the present disclosure.
Figure 2B:
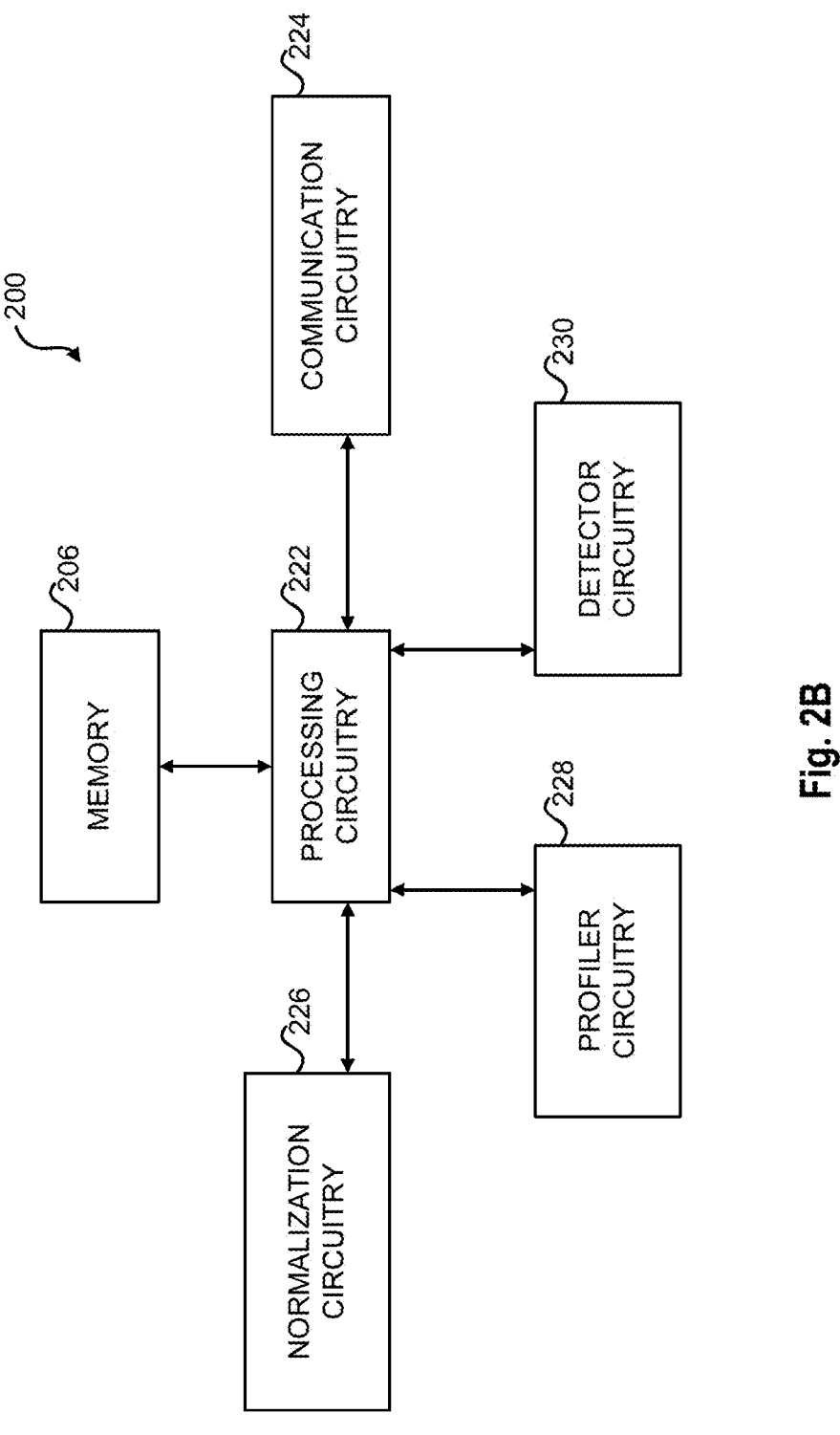

FIG. 2A and FIG. 2B are schematic diagrams of systems for detecting security threats 200, according to one or more aspects of the present disclosure. Turning to FIG. 2A, the system 200 may include a threat intelligence system 202. The threat intelligence system 202 may include one or more processors 204 and, in an embodiment, memory or a pool of memory. In another embodiment, each engine of the threat intelligence system 202 (e.g., a profiler engine 210, a detector engine 212, and/or a normalization engine 214) may include a memory, which can comprise a separate or dedicated memory, and/or, in embodiments, can access a pool of memory. In yet another embodiment, each engine may be comprised of instructions. The memory may store the instructions executable by the processor 204. Further, the threat intelligence system 202 or each engine may include an input/output module to facilitate or configured to enable communication between the threat intelligence system 202 and external devices or components. (e.g., the data repository 218, entities 216A, 216B, and up to 216N, and/or security computing devices 220A, 220B, and up to 220N).

In an embodiment, the threat intelligence system 202 may comprise a cluster (e.g., groups or sets) of computing devices configured to be able to process large amounts of data or big data (e.g., large and complex sets data) substantially in real-time. In such an embodiment, each engine (e.g., profiler engine 210, detector engine 212, and/or normalization engine 214) of the threat intelligence system may be included in or on and/or distributed on a plurality of the computing devices in the cluster. Thus, the functionality of each engine may be executed and/or performed many times in parallel and/or on a plurality of computing devices for different data or data sets.

Each memory included with or accessible by each engine may include instructions, and in some embodiments, the threat intelligence system 202 further may include other circuitry, specific to or dedicated for performing the functionality described in relation to the instructions. In an embodiment, the instructions may be distributed across one or more memories corresponding to a plurality of devices (e.g., each of the instructions may be stored in a plurality of a different memory and/or the same instructions may be stored in a plurality of different memories) Such instructions (or, in an embodiment, circuitry) may include a profiler engine 210, a detector engine 212, and a normalization engine 214. The profiler engine 210 may be configured to, or when executed by the processor may be configured to obtain or request data (e.g., in an embodiment, security logs, other security data, statistical data, and/or other data) from a data repository 218. The data repository 218 may be a database, a data lake, and/or other type of data storage. The data repository 218 may store data from one or more of the entities 216A, 216B, and up to 216N. The data from the one or more entities 216A, 216B, and up to 216N may include past telemetric data. The past telemetric data may be from a time period of about 1 day prior, about 1 week prior, about 1 month prior, about 1 year prior, or even longer periods of time. In other words, the past telemetric data may include historical data and/or data at rest associated with one or more entities 216A, 216B, and up to 216N. In an embodiment, the profiler engine 210 may obtain the data via an input/output module.

Upon reception of the data from the data repository 218, the profiler engine 210 may generate one or more statistical profiles. The statistical profiles may be generated via an algorithm and/or a machine learning model or classifier. The statistical profiles may include an amount or total that an entity (e.g., the one or more entities 216A, 216B, and up to 216N) performed an action, selected a service or application, utilized a service or application, visited a website, sent an e-mail, received an e-mail, utilized a cloud-based application, and/or accessed or communicated with a particular computing device or IP address, among other actions. Each of the statistical profiles may be associated with or correspond to one or more of the entities 216A, 216B, and up to 216N. The statistical profiles may include an indicator to indicate which entities of the one or more entities 216A, 216B, and up to 216N are associated with or correspond to the statistical profiles.

The instructions may include a detector engine 212. The detector engine 212 may generate one or more detectors. The one or more detectors may be based on one or more sequences or subsequences (e.g., one or more low fidelity security threats) organized in a threat chain. The one or more detectors may scan and/or analyze telemetric data from the one or more entities 216A, 216B, and up to 216N in real-time. In other words, as the one or more entities 216A, 216B, and up to 216N access functionality or perform actions, such accesses and/or performances may be analyzed or reviewed by the one or more detectors. The one or more detectors may scan or analyze specific accesses to functionality and/or performance of actions (e.g., one detector may scan for use of a cloud service, reception of an email from a specific or set of users, etc.).

Once one or more sequences or subsequences or a selected number of sequences or subsequences of a threat chain have been detected, the detector engine 212 may aggregate the detected sequences or subsequences and correlate the aggregated sequences or subsequences to the statistical profiles. In an embodiment, the detector engine 212 may aggregate sequences or subsequences from one or more detectors associated with a threat chain after a selected time (e.g., within about 1 minute after the first detection of a sequence or subsequence, within about 5 minute after the first detection of a sequence or subsequence, within about 10 minute after the first detection of a sequence or subsequence, after about 5 minutes, after about 10 minutes, after about 20 minutes, or longer).

As noted, after the aggregation of the sequences or subsequences, the detector engine 212 may correlate the aggregated sequences or subsequences to the statistical profiles or a corresponding statistical profile. Such a correlation may include, for example, generating a score based on a comparison between the aggregated sequences or subsequences and one or more of the statistical profiles. For example, different organizations (e.g., such as a cloud vendor) may provide data or commands in various different formats. The detector engine 212 and/or normalization engine 214, in such examples, may normalize commands issued to a group, e.g., listing resources may be normalized to a reconnaissance command, while requesting an authorization token may be normalized to an authorization command. Each organization may have a specified nomenclature for such commands, however, the detector engine 212 and/or normalization engine 214 may, via normalization, abstract such commands into one or more groups.

Once a score has been generated, the detector engine 212 may compare the score to a threshold score. If the threshold score is exceeded, then the detector engine 212 may generate an alert or a high severity alert. The detector engine 212 may transmit the alert or high severity alert to one or more security computing devices 220A, 220B, and up to 220N.

In another embodiment, the threat intelligence system 202 may include a normalization engine 214. In an embodiment, the threat intelligence system 202 may be device agnostic. In other words, the threat intelligence system 202 may analyze data (e.g., data at rest and/or real-time data) from a variety of different devices, computing devices, and/or systems. In such embodiments, the threat intelligence system 202 may normalize, format, or re-format data prior to analysis via the profiler engine 210 and/or the detector engine 212 (or the one or more detectors). The data, in such examples, may be formatted, via the normalization engine 214, such that the data is converted to a unified or similar format regardless of the device or system that the data is from. In another embodiment, score may be determined via account-based statistical profiles (e.g. a particular user has only performed a particular action a selected number of times, however the current number of performances is abnormal), via tenant-based profiles (e.g. the activity is abnormal for the user, and also for other users/accounts in an organization), and/or via IA-based profiles (e.g. utilizing multiple dimensions, such as account normal activity type, time of the day, frequency of commands run, number of commands, and/or type of commands, with some factors being more indicative of threat activity than others). In such embodiments, each profile may build a multidimensional space where a machine learning algorithm may determine how rare and/or abnormal an activity is and produce a score based on the various factors described above and herein.

Turning to FIG. 2B, in an embodiment, the system or apparatus for detecting security threats 200 may include processing circuitry 222, at least one memory 206 (and in embodiments, a series of memories that each can be associated with one of the profiler engine 210, the detector engine 212, and the normalization engine 214), communications circuitry 224, normalization circuitry 226, profiler circuitry 228, and detector circuitry 230, each of which will be described in greater detail below. While the various components are only illustrated in FIG. 2B as being connected with processing circuitry 228, it will be understood that the system or apparatus for detecting security threats 200 may further comprise a bus (not expressly shown in FIG. 2B) for passing information amongst any combination of the various components of the system or apparatus for detecting security threats 200. The system or apparatus for detecting security threats 200 further may include programming or instructions configured to execute various operations described herein, such as those described above in connection with FIG. 1 and FIG. 2A and below in connection with FIG. 3 through FIG. 5.

The processing circuitry 222 (and/or co-processor or any other processor assisting or otherwise associated therewith) may be in communication with the memory 206 via a bus for passing information amongst components of the system or apparatus for detecting security threats 200. The processing circuitry 222 may be embodied in a number of different ways and may, for example, include one or more processing devices configured to perform independently. Furthermore, the processing circuitry 222 may include one or more processors configured in tandem via a bus to enable independent execution of software instructions, pipelining, and/or multithreading. The use of the term "processor" may be understood to include a single core processor, a multi-core processor, multiple processors of the system or apparatus for detecting security threats 200, remote or "cloud" processors, or any combination thereof.

The processing circuitry 222 may be configured to execute software instructions stored in the memory 206 or otherwise accessible to the processing circuitry 222. In some cases, the processing circuitry 222 may be configured to execute hard-coded functionality. As such, whether configured by hardware or software methods, or by a combination of hardware with software, the processing circuitry 222 represents an entity or device (e.g., an element that can be physically embodied in circuitry) capable of performing operations according to various embodiments of the present invention while configured accordingly. Alternatively, as another example, when the processing circuitry 222 is embodied as an executor of software instructions, the software instructions may specifically configure the processing circuitry 222 to perform the algorithms and/or operations described herein when the software instructions are executed.

The memory 206 may be a non-transitory machine readable storage medium and may include, for example, one or more volatile and/or non-volatile memories. In other words, for example, the memory 206 may be an electronic storage device (e.g., a computer readable storage medium). The memory 206 may be configured to store information, data, content, applications, software instructions, or the like, for enabling the apparatus to carry out various functions in accordance with example embodiments contemplated herein.

The communications circuitry 224 may include at least one device or circuitry embodied in either hardware or a combination of hardware and software that is configured to receive and/or transmit data from/to a network and/or any other device, circuitry, or module in communication with the system or apparatus for detecting security threats 200. In this regard, the communications circuitry 224 may include, for example, a network interface for enabling communications with a wired or wireless communication network. For example, the communications circuitry 224 may include one or more network interface cards, antennas, buses, switches, routers, modems, and supporting hardware and/or software, or any other device suitable for enabling communications via a network. Furthermore, the communications circuitry 224 may include the processing circuitry for causing transmission of such signals to a network or for handling receipt of signals received from a network.

The system or apparatus for detecting security threats 200 generally will include a normalization circuitry 226 configured to normalize or format data received via the system or apparatus for detecting security threats 200. For example, as the system or apparatus for detecting security threats 200 obtains data at rest (e.g., from a database, data lake, etc.) and/or real-time data (e.g., from one or more entities), the system or apparatus for detecting security threats 200 may normalize or format, via the normalization circuitry 226, such data. Thus, the normalized data may be in a format usable and/or readable by the system or apparatus for detecting security threats 200 and the circuitry therein (e.g., profiler circuitry 228 and/or detector circuitry 230).

The system or apparatus for detecting security threats 200 will include a profiler circuitry 228 configured to generate one or more statistical profiles based on data at rest associated with one or more entities. The data at rest may be stored in a database, data lake, or other storage location. The data at rest may be historical data associated with one or more entities. The generated statistical profiles may be stored in a profile database or other storage location accessible by the system or apparatus for detecting security threats 200.

The system or apparatus for detecting security threats 200 will include a detector circuitry 230 configured to generate one or more detectors based on sequences, subsequences, and/or low fidelity threats for each of one or more threat chains; monitor and/or scan for telemetric and/or real-time data associated with the one or more entities (e.g., via the one or more detectors) to detect sequences, subsequences, and/or low fidelity threats; aggregate detected sequences, subsequences, and/or low fidelity threats associated with a threat chain; correlate the statistical profiles with the aggregated sequences, subsequences, and/or low fidelity threats for a threat chain; and generate a score based on the correlation. The detector circuitry 230, as noted, may generate the one or more detectors. Each of the one or more detectors may be based on and/or configured to detect a sequence, subsequence, and/or low fidelity threat of one of one or more threat chains.

The one or more detectors may utilize normalized real-time data to detect the sequence, subsequence, and/or low fidelity threat. Once a selected amount of sequences, subsequences, and/or low fidelity threats of a threat chain are detected and/or after a selected amount of time, the detector circuitry 230 may aggregate the detected sequences, subsequences, and/or low fidelity threats of the threat chain. The detector circuitry 230 may correlate the sequences, subsequences, and/or low fidelity threats of the threat chain with the statistical profiles or a statistical profile, thereby generating a score. The detector circuitry 230 may then, if the score exceeds a threshold score, generate and transmit an alert or high severity alert. Thus, a security expert may receive fewer and more relevant alerts and be enabled to review the alert and take corrective action.

Figure 3:
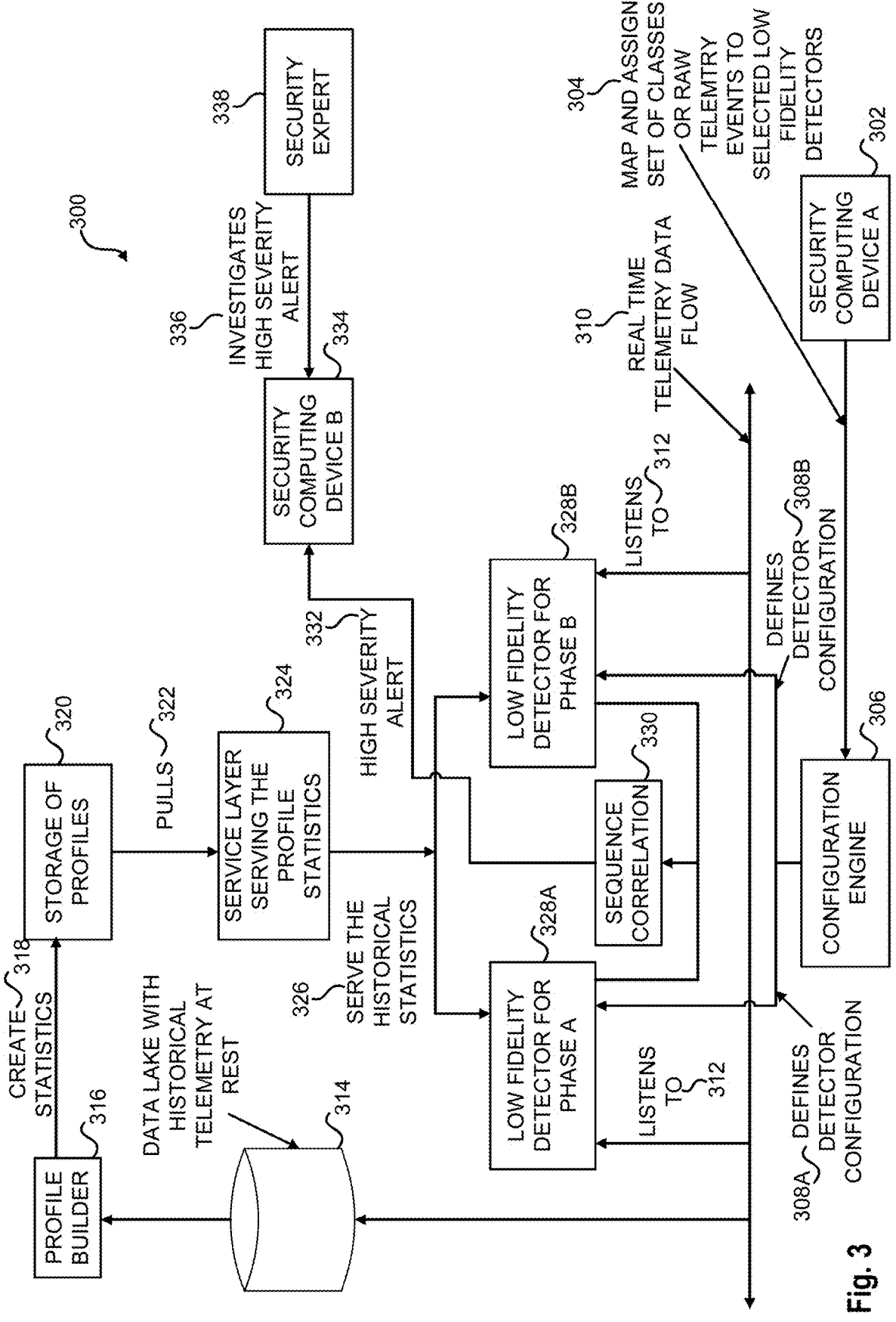
FIG. 3 is a schematic diagram of a system operating to detect security threats, according to principles of the present disclosure.

FIG. 3 is a schematic diagram of a system 300 operating to detect security threats, according to one aspect of the present disclosure. The system 300 may include various devices, components, and/or interfaces. The system 300 may include or interface with a security computing device A 302 (or one or more security computing devices). The security computing device A 302 may transmit a mapping and/or assignment of a set of classes and/or raw telemetric events to selected low fidelity detectors (see 304) to a configuration engine 306. In another embodiment, the security computing device A 302 may review and refine the mappings and/or assignments. In such embodiments, the results (e.g., alerts or lack of alerts) of a current set of low fidelity detectors (e.g., low fidelity detector for phase A and B 328A, 328B) may be reviewed by the security computing device and updated or refined based on such results. In another embodiment, the security computing device may be or may include a machine learning model configured to and/or trained to adjust the mappings and/or assignment based on updated and labeled data (e.g., results).

The configuration engine 306 may utilize such a mapping and/or assignment to define a detector configuration (see 308A and 308A). The detector configuration may be transmitted to and/or define a plurality of different low fidelity detectors for different phases (e.g., low fidelity detector for phase A and B 328A, 328B). While two low fidelity detectors are illustrated in FIG. 3, additional detectors may be included in the system 300.

Prior to, during, or subsequent to definition of the plurality of different low fidelity detectors for different phases, a real time telemetry data flow 310 may be stored in a data lake or database. The data stored in the database may be at rest or, in other words, after storage, the data may remain static or the same. As such, the data lake may be a data lake with historical telemetry at rest 314. A profile builder 316 may pull or obtain the data stored in the data lake and create statistics based on that data. The statistics may be used to generate profiles or may define profiles. The profiles may be stored in storage 320. The storage 320 may be a database, memory, or other storage area.

When one or more profiles are available, a service layer (e.g., servicing layer for serving the profile statistics 324) may provide the profiles directly to the low fidelity detectors and/or to a system, engine, and/or circuitry associated with correlation. The low fidelity detectors (e.g., low fidelity detector for phase A and B 328A, 328B) may listen to 312 to the real time telemetry data flow 310. If the low fidelity detectors detect a specified sequence or condition, the low fidelity detectors may aggregate such detections and then perform a sequence correlation 330 (e.g., the aggregated sequences being correlated to a profile). Such a correlation may cause or generate a score and compare the score to a threshold. If the score exceeds the threshold, a high severity alert 332 may be generated. The high severity alert 332 may be transmitted to security computing device B 334 or another computing device. A security expert 338 may investigate the high severity alert 336 on or via the security computing device.

FIG. 4 is a flow diagram for detecting security threats, according to one aspect of the present disclosure FIG. 4 is a method/process for detecting malicious events, according to one aspect of the present disclosure. It also will be understood that any of the FIGS. described herein may implement the method 400, in particular FIGS. 1-3. The method 400 may be included in one or more programs, protocols, or instructions loaded into memory of a computing device. The order in which the operations are described is not intended to be construed as a limitation, and any number of the described blocks may be combined in any order and/or in parallel to implement the disclosed methods.

At block 402, a system or apparatus (e.g., system 100 and/or system 200) may receive security data from one or more data sources. The data sources may include a database, a data lake, or some other storage device. Such data sources may receive data over time from a telemetric source. The data may include prior, past, and/or historical data related to one or more entities.

At block 404, once the system or apparatus has received or obtained the security data, the system or apparatus may normalize the data. In an embodiment, the system or apparatus may be configured to be compatible with a plurality of varying or different entities. The varying or different entities may provide data in varying formats. To ensure that the system or apparatus may process the varying formats of data, the system or apparatus may first normalize the data.

At block 406, the system or apparatus may provide the normalized data to a profiler engine. At block 408, the profiler engine may generate one or more statistical profiles. The statistical profiles may include one or more statistics or other data related to one or more entities. At block 410, the system or apparatus may generate one or more detectors based on sequences, subsequences, or low fidelity security threats of each of one or more threat chains. A threat chain may comprise a series of sequences, subsequences, or low fidelity security threats. One or more of the sequences, subsequences, or low fidelity security threats occurring may indicate a high severity threat. In another embodiment, the order in which the sequences, subsequences, or low fidelity security threats may or may not indicate a high severity threat.

At block 412, the system or apparatus may monitor telemetric data. The data may be real-time data associated with the one or more entities. At block 414, the system or apparatus may determine whether one or more of the detectors have detected sequences, subsequences, or low fidelity security threats. The amount or number of detections at which the system or apparatus may determine whether to move to block 416 may be dependent on the threat chain that the one or more detectors are associated with. If one or more detections have not been made or if a specified amount of detections have not been made, then the system or apparatus may continue to monitor telemetric data. If one or more detections have been made or if the specified amount of detections have been made, then, at block 416, the system or apparatus may aggregate the detected one or more sequences, subsequences, or low fidelity security threats.

At block 418, the system or apparatus may correlate the aggregated sequences, subsequences, or low fidelity security threats with the statistical profiles to generate a score. At block 420, the system or apparatus may determine whether the score or threat score exceeds a threshold score. If the system or apparatus determines that the threshold score is exceeded, then the system or apparatus may generate an alert or high severity alert. The system or apparatus may continue to monitor telemetric data in real time during execution of the blocks described above.

Figure 5:
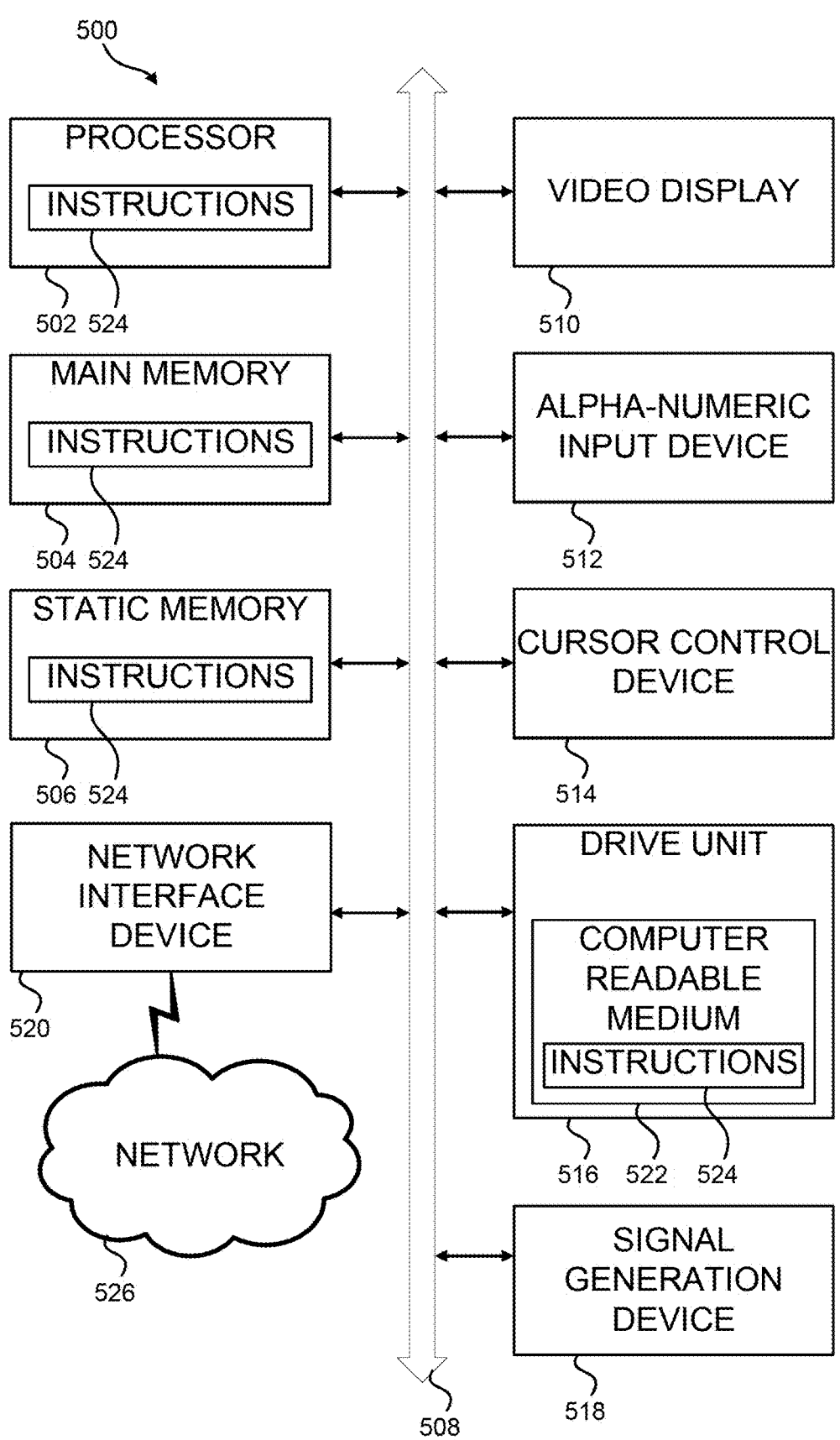
FIG. 5 is a schematic diagram of an example information handling system capable of administering each of the specific embodiments, according to principles of the present disclosure.

FIG. 5 is a schematic diagram of an example embodiment of an information handling system capable of administering each of the specific embodiments, according to one aspect of the present disclosure. FIG. 5 is a schematic diagram of an information handling system capable of administering each of the specific embodiments, according to one aspect of the present disclosure. The information handling system 500 can represent the systems and methods of FIGS. 1 through 4. The information handling system 500 may include a computer system or processor 502 such as a central processing unit (CPU), a graphics processing unit (GPU), or both. Moreover, the information handling system 500 can include a main memory 504 and a static memory 507 that can communicate with each other via a bus 508. The information handling system 500 includes near-field communications (NFC) device and interface 518, such as an antenna and NFC subsystem.

The information handling system 500 can also include a disk drive unit 516, and a network interface device 520. As shown, the information handling system 500 further may include a video display unit 510, such as a liquid crystal display (LCD), an organic light emitting diode (OLED), a flat panel display, a solid state display, or a cathode ray tube (CRT), or other suitable display. The video display unit 510 may also act as an input accepting touchscreen inputs. Additionally, the information handling system 500 may include an input device 512, such as a keyboard, or a cursor control device, such as a mouse or touch pad, or a selectable interface on the display unit. The information handling system may include a battery system 514. The information handling system 500 can represent a device capable of telecommunications and whose can be share resources, voice communications, and data communications among multiple devices. The information handling system 500 can also represent a server device whose resources can be shared by multiple client devices, or it can represent an individual client device, such as a laptop or tablet personal computer.

The information handling system 500 can include a set of instructions that can be executed to cause the processor to perform any one or more of the methods or computer based functions disclosed herein. The processor 502 may operate as a standalone device or may be connected such as using a network, to other computer systems or peripheral devices.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video, or data communication. Further, while a single information handling system 500 is illustrated, the term "system" shall also be taken to include any collection of systems or subsystems that individually or jointly execute a set, or multiple sets, of instructions to perform one or more computer functions.

The disk drive unit 516 or static memory 507 may include a computer-readable medium 522 in which one or more sets of instructions 524 such as software can be embedded. In embodiments, the disk drive unit 516 or static memory 507 also contains space for data storage. Further, the instructions 524 may embody one or more of the methods or logic as described herein. In a particular embodiment, the instructions 524 may reside completely, or at least partially, within the main memory 504, the static memory 506, and/or within the processor 502 during execution by the information handling system 500. The main memory 504 and the processor 502 also may include computer-readable media. The network interface device 520 can provide connectivity to a network 526, e.g., a wide area network (WAN), a local area network (LAN), wireless network (IEEE 802), or other network. The network interface device 520 may also interface with macrocellular networks including wireless telecommunications networks such as those characterized as 2G, 3G, 4G, 5G, LTE or similar wireless telecommunications networks similar to those described above. The network interface device 520 may be a wireless adapter having antenna systems 532 for various wireless connectivity and radio frequency subsystems 530 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal; so that a device connected to a network 528 can communicate voice, video, or data over the network 528. Further, the instructions 524 may be transmitted or received over the network 528 via the network interface device 520. In one example embodiment, BIOS/FW code reside in memory 504, and include machine-executable code that is executed by processor 502 to perform various functions of information handling system 500.

Information handling system 500 includes one or more application programs, and Basic Input/Output System and Firmware (BIOS/FW) code. BIOS/FW code functions to initialize information handling system 500 on power up, to launch an operating system, and to manage input and output interactions between the operating system and the other elements of information handling system 500.

In another embodiment (not illustrated), application programs and BIOS/FW code reside in another storage medium of information handling system 500. For example, application programs and BIOS/FW code can reside in the disk drive unit 516, in a ROM (not illustrated) associated with information handling system 500, in an option-ROM (not illustrated) associated with various devices of information handling system 500, in a storage system, such as static memory 507, in a storage system (not illustrated) associated with a network channel or the network interface device 520, in another storage medium of the information handling system 500, or a combination thereof. Application programs and BIOS/FW code can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The term "computing device" or "system device" is used herein to refer to any one or all of programmable logic controllers (PLCs), programmable automation controllers (PACs), industrial computers, desktop computers, servers, cluster, virtual computer, computing node, node, personal data assistants (PDAs), laptop computers, tablet computers, smart books, palmtop computers, personal computers, smartphones, wearable devices, and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used herein to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "non-transitory machine-readable storage medium" is used herein to refer to any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

The term "processor" or "processing circuitry" is used herein to refer to any one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A system for detecting security threats, comprising:
a memory; and
at least one processor comprising:
    a profiler engine configured to:
        obtain data at rest from a repository and corresponding to a plurality of entities, mine selected statistical information from the obtained data at rest and generate a plurality of statistical profiles based on the obtained data at rest, the statistical profiles comprising the selected statistical information relating to each entity of the plurality of entities; and
        store the plurality of statistical profiles in a profile database; and
    a detector engine configured to:
        generate one or more low fidelity detectors based on the statistical profiles of each entity of the plurality of entities organized in one or more threat chains, the one or more low fidelity detectors configured to detect a plurality of low level security threats in one or more threat chains, wherein each of the one or more threat chains comprises a sequence of events defining a security threat, wherein an individual low level security threat in a threat chain constitutes a non-actionable alert condition;
        monitor, via each of the one or more low fidelity detectors, real-time data corresponding to the plurality of entities for the plurality of low level security threats, generate a score based on a correlation of a detected aggregation of the plurality of low level security threats to the plurality of statistical profiles, wherein the score is further based on an occurrence amount of low level security threats in one of the one or more threat chains; and
        if the score exceeds a threshold, generate an alert.

2. The system of claim 1, wherein the obtained data at rest comprises historical data, and wherein the repository comprises a data lake.

3. The system of claim 1, wherein the plurality of entities comprise one or more of a user or a computing device.

4. The system of claim 1, wherein the one or more low fidelity detectors are respectively configured to detect a sequence, subsequence, low level security threat, or a combination thereof of one of the threat chains.

5. The system of claim 1, wherein the score is further based on an order in which low level security threats occur.

6. The system of claim 1, wherein each of the plurality of statistical profiles includes statistical analysis for a corresponding entity.

7. The system of claim 6, wherein one or more of the plurality of statistical profiles include statistics corresponding to a service accessed by the corresponding entity.

8. The system of claim 1, the at least one processor further comprising a normalization engine configured to:
    receive data from a plurality of different data sources; and
    normalize the received data prior to generation of the plurality of statistical profiles and storage thereof in the profile database.

9. A computer-implemented method for detecting security threats, the method comprising:

receiving security data associated with one or more entities from a plurality of data sources;

normalizing the security data to generate normalized data;

providing the normalized data to a profiler engine;

generating, via the profiler engine, one or more statistical profiles for the one or more entities based on the normalized data;

generating one or more detectors based on one or more subsequences of low level security threats organized in a plurality of threat chains, wherein an individual low level security threat in a threat chain constitutes a non-actionable alert condition;

monitoring, via the one or more detectors, telemetric data in real time for the one or more subsequences for each of the plurality of threat chains;

in response to detection of one or more subsequences of one of the plurality of threat chains by the one or more detectors, aggregating the detected one or more subsequences;

generating a score based on a correlation of the aggregated detected one or more subsequences to the one or more statistical profiles, wherein the score is further based on an order of occurrence of the low level security threats in the one or more subsequences in a corresponding threat chain of the plurality of threat chains; and if the score exceeds a threshold score, generating a high severity alert.

10. The computer-implemented method of claim 9, further comprising, prior to generating the one or more statistical profiles, obtaining the security data from a data lake, wherein the security data includes historical data.

11. The computer-implemented method of claim 9, wherein the one or more subsequences comprise one or more of events, files associated with the events, time stamps, or identifying data.

12. The computer-implemented method of claim 11, wherein the identifying data comprises one or more of usernames or IP addresses.

13. The computer-implemented method of claim 9, further comprising storing the one or more statistical profiles in a profile database.

14. The computer-implemented method of claim 9, wherein normalizing normalizes the security data based on a command associated with the security data and identified based on nomenclature associated with the command.

15. The computer-implemented method of claim 9, wherein normalizing normalizes the security data based on a unified format for the security data in a device agnostic manner.

16. A non-transitory machine-readable storage medium with instructions stored thereon that, responsive to execution by a processing device, cause the processing device to perform or control performance of operations comprising:

in response to reception of security data associated with one or more entities from a plurality of data sources, normalizing the security data and storing the normalized security data;

generating one or more statistical profiles for the one or more entities based on the stored normalized security data;

generating one or more detectors based on one or more subsequences organized in a plurality of threat chains of low level security threats, wherein an individual low level security threat in a threat chain constitutes a non-actionable alert condition;

monitoring, via the one or more detectors, telemetric data from a cloud-based platform in real time for the one or more subsequences for each of the plurality of threat chains;

in response to detection of one or more subsequences of one of the plurality of threat chains by the one or more detectors, aggregating the detected one or more subsequences;

generating a score based on a correlation of the aggregated detected one or more subsequences to the one or more statistical profiles, wherein the score is further based on an order of occurrence of the low level security threats in the one or more subsequences in a corresponding threat chain of the plurality of threat chains; and if the score exceeds a threshold score, generating a high severity alert.

17. The non-transitory machine-readable storage medium of claim 16, wherein the one or more entities comprise one or more users.

18. The non-transitory machine-readable storage medium of claim 17, wherein generating the one or more statistical profiles for the one or more entities comprises conducting a statistical analysis of the stored normalized security data; and wherein a result of the statistical analysis of the stored normalized security data comprises a number of times each of the one or more users has accessed a cloud-based service on the cloud-based platform.

19. A computer-implemented method for detecting security threats, the method comprising:

storing historical telemetric data at rest in a data lake;

building statistical profiles based on the historical telemetric data at rest in the data lake;

receiving one or more definitions for one or more low fidelity detectors configured to detect different low level security threats in one or more threat chains, wherein each of the one or more threat chains comprises a sequence of events defining a security threat, wherein an individual low level security threat in a threat chain constitutes a non-actionable alert condition;

generating the one or more low fidelity detectors based on the one or more definitions;

listening to real-time telemetric data via the one or more low fidelity detectors;

in response to detection of low level security threats by the one or more low fidelity detectors, correlating the low level security threats with the statistical profiles to generate a score, wherein the score is further based on an occurrence amount of low level security threats in one of the one or more threat chains; and in response to the score exceeding a threshold, generating a high severity alert.

20. The computer-implemented method of claim 19, further comprising:

reviewing and refining the one or more low fidelity detectors with a security computing device; and transmitting the high severity alert to the security computing device or another security computing device.

* * * * *